(12) United States Patent
Seki (10) Patent No.: US 10,892,662 B2
(45) Date of Patent: Jan. 12, 2021

(54) ROTARY ELECTRIC MACHINE HAVING AN END COIL COVER MEMBER USED FOR IMPROVEMENT IN COOLING EFFICIENCY

(71) Applicant: HONDA MOTOR CO., LTD., Tokyo (JP)

(72) Inventor: Yoshiaki Seki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/278,792

(22) Filed: Feb. 19, 2019

(65) Prior Publication Data

US 2019/0260257 A1 Aug. 22, 2019

(30) Foreign Application Priority Data

Feb. 21, 2018 (JP) .................................. 2018-028884

(51) Int. Cl.
*H02K 3/52* (2006.01)
*H02K 3/34* (2006.01)
(Continued)

(52) U.S. Cl.
CPC ............ *H02K 3/522* (2013.01); *H02K 1/148* (2013.01); *H02K 3/34* (2013.01); *H02K 5/20* (2013.01); *H02K 9/19* (2013.01)

(58) Field of Classification Search
CPC .......... H02K 1/148; H02K 3/34; H02K 3/522; H02K 5/20; H02K 9/19
(Continued)

(56) References Cited

U.S. PATENT DOCUMENTS

| 2010/0045125 A1* | 2/2010 | Takenaka ................. H02K 9/19 310/54 |
| 2011/0115316 A1 | 5/2011 | Isogai et al. |

(Continued)

FOREIGN PATENT DOCUMENTS

| CN | 105917555 | 8/2016 |
| JP | 2010-226841 | 10/2010 |

(Continued)

OTHER PUBLICATIONS

Japanese Notice of Allowance for Japanese Patent Application No. 2018-028884 dated Oct. 23, 2019.
(Continued)

*Primary Examiner* — Tulsidas C Patel
*Assistant Examiner* — Rashad H Johnson
(74) *Attorney, Agent, or Firm* — Amin, Turocy & Watson, LLP (57) ABSTRACT

Provided is a rotary electric machine which includes a stator having an annular stator core and a winding mounted on the stator core and configured to have a coil end protruding in an axial direction of the stator core, a conductive member electrically connected to the winding of the stator and in which at least a portion thereof is disposed above the coil end, a cover member covering the conductive member from below and disposed above the coil end, and a refrigerant supply unit configured to discharge a refrigerant in a predetermined direction and supply the refrigerant to the stator. A hole penetrating in a vertical direction is provided in the cover member at a position corresponding to the coil end.

4 Claims, 6 Drawing Sheets

(51) Int. Cl.
    *H02K 9/19*         (2006.01)
    *H02K 1/14*         (2006.01)
    *H02K 5/20*         (2006.01)

(58) Field of Classification Search
    USPC .................... 310/40 R, 52, 54, 64, 71, 89
    See application file for complete search history.

(56) References Cited

U.S. PATENT DOCUMENTS

| | | | |
|---|---|---|---|
| 2015/0015095 A1* | 1/2015 | Kurono | H02K 3/24 310/54 |
| 2018/0026493 A1* | 1/2018 | Jung | H02K 9/005 310/52 |
| 2018/0216617 A1* | 8/2018 | Fukasaku | H02K 11/33 |
| 2019/0296611 A1* | 9/2019 | Kimoto | H02K 3/345 |

FOREIGN PATENT DOCUMENTS

| | | |
|---|---|---|
| JP | 5815846 | 11/2015 |
| JP | 2017-011791 | 1/2017 |

OTHER PUBLICATIONS

Xie Yunan, "Develop of YRKK800-10 10kV Wound Three-Phase Asynchronous Motor", «Electric Machines & Control Application», 2013, 40(5), May 10, 2013.
Mecrow B. C., Fully Pitched-Winding Switched-Reluctance and Stepping-Motor Arrangements., «IEE Proceedings Electrical Power Applications», vol. 140, May 19, 2009.
Chinese Office Action for Chinese Patent Application No. 201910121020.7 dated Sep. 3, 2020.

\* cited by examiner

ROTARY ELECTRIC MACHINE HAVING AN END COIL COVER MEMBER USED FOR IMPROVEMENT IN COOLING EFFICIENCY

CROSS-REFERENCE TO RELATED APPLICATION

Priority is claimed on Japanese Patent Application No. 2018-028884, filed in Japan on Feb. 21, 2018, the content of which is incorporated herein by reference in its entirety.

BACKGROUND OF THE INVENTION

Field of the Invention

The present invention relates to a rotary electric machine.

Description of Related Art

Conventionally, rotary electric machines have been used as power sources for hybrid automobiles and electric automobiles. A rotary electric machine includes a stator core having a slot, and a coil in which a portion thereof is disposed in the slot to be mounted on the stator core. The coil is formed of a plurality of conductors whose core wires are covered with an insulating film.

Incidentally, since heat generation of coils may increase as the output power of rotary electric machines has become higher or the like in recent years, there are cases in which a rotary electric machine is effectively cooled using a refrigerant.

For example, the rotary electric machine described in Japanese Patent No. 5815846 (hereinafter referred to as Patent Document 1) includes a stator, a refrigerant supply unit which supplies a refrigerant for cooling the stator, a plurality of bus bars electrically relaying an external power line and coils of multiple phases, and an insulating cover which covers the bus bars. A through hole vertically penetrating therethrough is provided in the insulating cover.

According to the technology described in Patent Document 1, since a cooling liquid can be discharged through the through hole when a cooling liquid has entered the insulating cover, short-circuiting between the bus bars can be prevented and deterioration of the insulating cover, the cooling liquid itself, or the like caused by accumulation of the cooling liquid can be inhibited.

SUMMARY OF THE INVENTION

Incidentally, as the output power becomes higher in rotary electric machines, further improvement in efficient cooling of the rotary electric machines is desired.

An aspect of the present invention has been made in view of the above circumstances, and an objective thereof is to provide a rotary electric machine in which cooling can be effectively performed as compared with the conventional technology.

In order to solve the above-described problem and achieve the objective, the present invention employs the following aspects.

(1) A rotary electric machine according to one aspect of the present invention includes a stator including an annular stator core and a winding mounted on the stator core and configured to have a coil end protruding in an axial direction of the stator core, a conductive member electrically connected to the winding of the stator and in which at least a portion thereof is disposed above the coil end, a cover member covering the conductive member from below and disposed above the coil end, and a refrigerant supply unit configured to discharge a refrigerant in a predetermined direction and supply the refrigerant to the stator, wherein a hole penetrating in a vertical direction is provided in the cover member at a position corresponding to the coil end.

(2) In the above-described aspect (1), a guide portion which guides the refrigerant to the hole may be provided in the cover member.

(3) In the above-described aspect (1) or (2), the cover member may include an accommodating recess which is able to accommodate the conductive member, the accommodating recess may include a curved portion at a position corresponding to the coil end in a plan view, and the hole may be formed at a corner portion of the curved portion.

(4) In any one of the above-described aspects (1) to (3), the winding may be formed by a plurality of segment coils used by being connected to each other, the coil end may include a connecting portion to which a plurality of segment coils are connected, and the cover member may be disposed above the coil end including the connecting portion.

According to the above-described aspect (1), since the conductive member in which at least a portion thereof is disposed above the coil end, the cover member covering the conductive member from below and disposed above the coil end, and the refrigerant supply unit configured to supply a refrigerant are provided, and the hole penetrating in a vertical direction is provided in the cover member at a position corresponding to the coil end, a refrigerant supplied from the refrigerant supply unit and having entered the cover member falls through the hole due to gravity and is supplied to the coil end thereunder. Thereby, the refrigerant can permeate from the coil end and cool the winding and the stator core. Also, as in the conventional technology, short-circuiting of the conductive member can be prevented, and deterioration of the cover member, a refrigerant, or the like caused by accumulation of a refrigerant can be inhibited. Therefore, according to the above-described aspect (1), since deterioration of the cover member, a refrigerant, or the like can be inhibited and the stator can be cooled by a refrigerant discharged through the hole of the cover member, cooling can be effectively performed as compared with the conventional technology.

According to the above-described aspect (2), since the guide portion for guiding a refrigerant to the hole is provided in the cover member, a refrigerant that has entered the cover member falls through the hole due to gravity without staying and is supplied to the coil end thereunder. Therefore, deterioration of the cover member, a refrigerant, or the like can be further inhibited, and the stator can be cooled by a refrigerant discharged through the hole of the cover member.

According to the above-described aspect (3), since the cover member includes the accommodating recess which is able to accommodate the conductive member and the hole is formed at a corner portion of the curved portion in the accommodating recess, a refrigerant that has entered the cover member is discharged without staying at the corner portion of the accommodating recess. Therefore, deterioration of the cover member, a refrigerant, or the like can be further inhibited, and the stator can be cooled by a refrigerant discharged through the hole of the cover member. Further, since a creepage distance as an insulation distance can be secured by providing the accommodating recesses capable of accommodating the conductive member, insulation of the conductive member can be secured while improving ease of layout.

According to the above-described aspect (4), since the coil end includes a connecting portion to which a plurality of segment coils are connected and the cover member is disposed above the coil end including the connecting portion, a refrigerant can be supplied to the connecting portion which is more likely to generate heat than a crossing portion among the coil ends through the hole of the cover member. Therefore, according to the above-described aspect (4), the winding can be efficiently cooled.

DETAILED DESCRIPTION OF THE INVENTION

Hereinafter, each embodiment of the present invention will be described with reference to the drawings.

Figure 1:
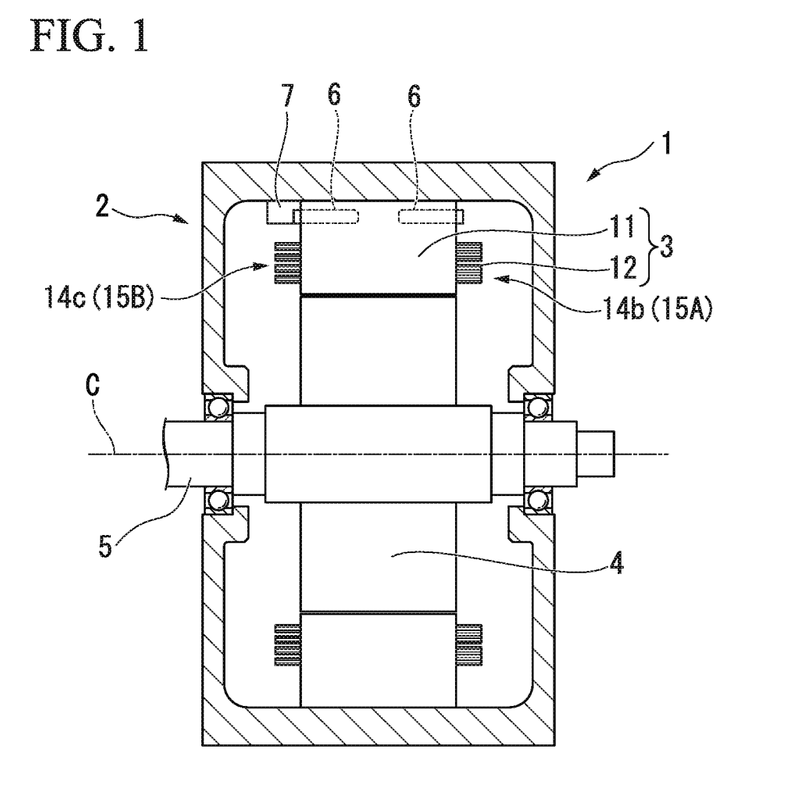
FIG. 1 is a cross-sectional view illustrating a schematic configuration of a rotary electric machine according to an embodiment.

FIG. 1 is a cross-sectional view illustrating a schematic configuration of a rotary electric machine according to an embodiment.

As illustrated in FIG. 1, a rotary electric machine 1 according to the embodiment includes a case 2, a stator 3, a rotor 4, an output shaft 5, a refrigerant supply unit 6, and a cover member 7.

The rotary electric machine 1 of the present embodiment is a traveling motor mounted, for example, on a vehicle such as a hybrid automobile or an electric automobile. However, a configuration of the present embodiment is not limited to the above-described example and can also be applied to motors for other applications such as power generation motors mounted on vehicles. Further, the configuration of the present embodiment is applicable to so-called general rotary electric machines which are rotary electric machines including generators other than those mounted on vehicles.

Also, in the following description, a direction along an axis C of a rotation center of the rotor 4 is referred to as an axial direction, a direction perpendicular to the axis C is referred to as a radial direction, and a direction around the axis C is referred to as a circumferential direction in some cases. Further, in the following description, upward and downward directions are coincident with upward and downward directions in a vertical direction.

The rotor 4 may include, for example, a rotor core and a magnet attached to the rotor core and is rotationally driven inside the stator 3. The rotor 4 of the present embodiment is a so-called interior permanent magnet (IPM) rotor, and the magnet is inserted into the rotor core and is covered by an end surface plate in the axial direction so that movement thereof in the axial direction is restricted.

The output shaft 5 is connected to the rotor 4 and outputs rotation of the rotor 4 as a driving force.

The stator 3 is formed in an annular shape and may be attached to, for example, an inner circumferential surface of the case 2. The stator 3 includes a stator core 11 and a winding 12 attached to the stator core 11 and applies a rotating magnetic field to the rotor 4.

Figure 2:
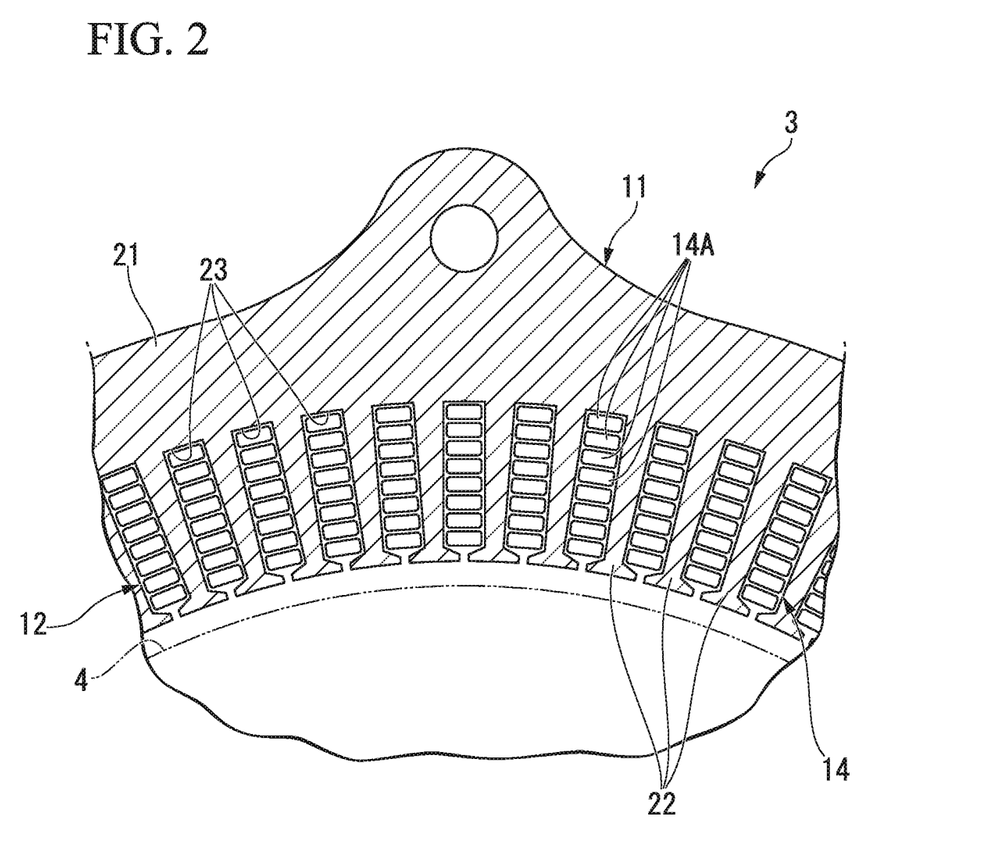
FIG. 2 is a cross-sectional view illustrating a portion of a stator.

FIG. 2 is a cross-sectional view illustrating a portion of the stator. In FIG. 2, the rotor 4 is illustrated by a double dotted-dashed line so that the stator 3 can be easily understood.

As illustrated in FIG. 2, the stator 3 includes the stator core 11 and the winding 12. Also, in the stator 3, there are cases in which, for example, a solidified filler such as a varnish or the like may be additionally provided in slots 23, but illustration and description thereof will be omitted for convenience of explanation in the present application.

The stator core 11 is formed in an annular shape surrounding the rotor 4. The stator core 11 is formed by stacking a plurality of electromagnetic steel sheets in the axial direction. Further, the stator core 11 may be, for example, a split-type stator core formed by connecting a plurality of pieces split in the circumferential direction to each other.

The stator core 11 includes an annular yoke portion 21, a plurality of teeth portions 22, and a plurality of slots 23. The plurality of teeth portions 22 protrudes from the yoke portion 21 toward an inner side in the radial direction of the stator core 11. Each of the slots 23 is formed between two teeth portions 22 adjacent to each other in the circumferential direction of the stator core 11. Therefore, the plurality of slots 23 are disposed side by side in the circumferential direction of the stator core 11. Each of the slots 23 penetrates through the stator core 11 in the axial direction of the stator core 11. The slot 23 of the present embodiment is an open slot whose inner side in the radial direction is open. Further, the configuration of the present embodiment is not limited thereto, and can also be applied to a closed slot whose inner side in the radial direction is closed.

The winding 12 is accommodated in the slot 23 of the stator core 11 to be mounted on the stator core 11. The winding 12 is a three-phase coil including U-phase, V-phase and W-phase. The winding 12 of the present embodiment is formed by a plurality of segment coils 14 which are connected to each other to be used.

Figure 3:
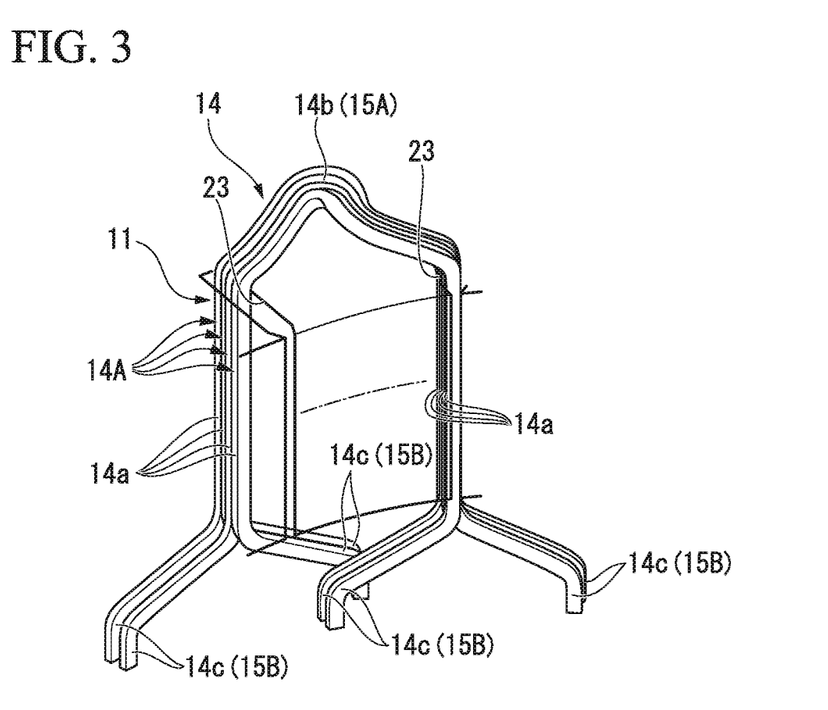
FIG. 3 is a perspective view illustrating a segment coil.

FIG. 3 is a perspective view illustrating a segment coil. Also, one segment coil 14 is illustrated in FIG. 3 and illustration of the other segment coil accommodated in the same slot 23 is omitted. Further, FIG. 3 is an illustration seen through the stator core 11.

As illustrated in FIG. 3, the segment coil 14 is formed by a plurality (four, for example) of segment conductors 14A. A core wire of each of the segment conductors 14A is, for example, a rectangular wire.

The segment conductor 14A includes a pair of insertion portions 14*a* formed in a linear shape, a crossing portion 14*b*, and a pair of connecting portions 14*c*. The pair of insertion portions 14*a* are separately accommodated in slots 23 different from each other in a state of being covered by, for example, insulating paper (not illustrated). The plurality of segment coils 14 are arranged in the order of U-phase, U-phase, V-phase, V-phase, W-phase, W-phase, U-phase, U-phase . . . in the circumferential direction of the stator core 11.

The crossing portion 14*b* connects one ends of the pair of insertion portions 14*a*. The crossing portion 14*b* is disposed outside the slots 23 on one side in the axial direction (in this embodiment, on a side opposite to a side on which the cover member 7 to be described below is disposed).

The connecting portion 14c is positioned at the other ends of the pair of insertion portions 14a and on a side opposite to the crossing portion 14b with respect to the insertion portion 14a. The connecting portion 14c is disposed outside the slots 23 on the other side in the axial direction (in this embodiment, on a side on which the cover member 7 to be described below is disposed). The connecting portion 14c is joined to a connecting portion 14c of the other segment coil 14 by tungsten-electrode inert gas (TIG) welding, laser welding or the like.

Thereby, the plurality of segment coils 14 are sequentially connected. Also, painting by powder-insulation is applied to the joined connecting portions 14c. As a result, electrical insulation of the connecting portion 14c is secured.

The crossing portion 14b and the connecting portion 14c are respectively coil ends 15A and 15B protruding in the axial direction of the stator core 11.

As illustrated in FIG. 1, the stator 3 and the rotor 4 configured as described above are accommodated in the case 2. The case 2 may be formed, for example, in a cylindrical shape capable of accommodating the stator 3 and the rotor 4. A refrigerant passage (not illustrated) through which a refrigerant discharged from the refrigerant supply unit 6 to be described below flows is formed in the case 2.

Figure 4:
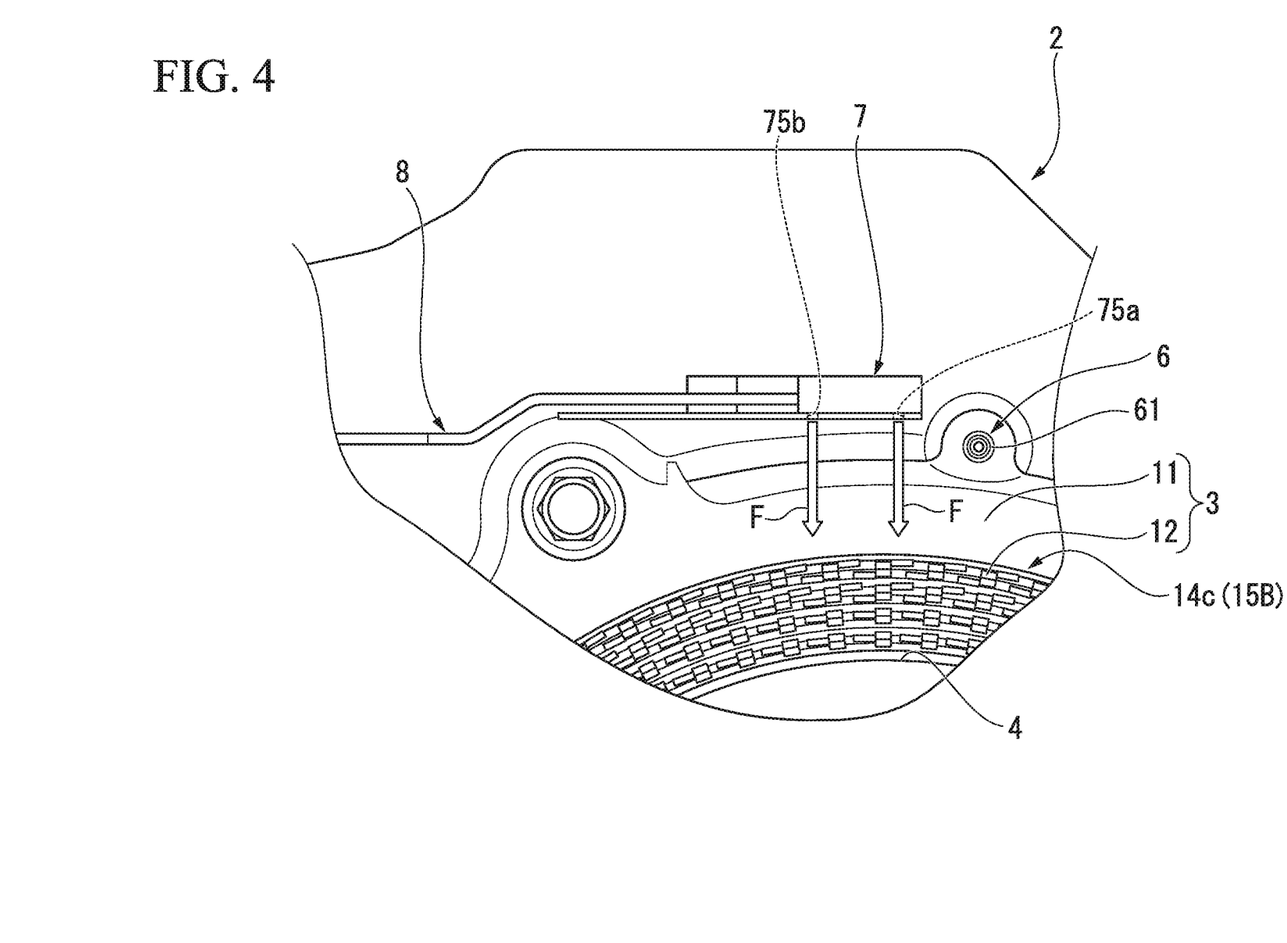
FIG. 4 is an explanatory view of a cover member and a vicinity of the cover member inside the case when viewed from an axial direction.

FIG. 4 is an explanatory view of a cover member and a vicinity of the cover member inside the case when viewed from the axial direction.

Figure 5:
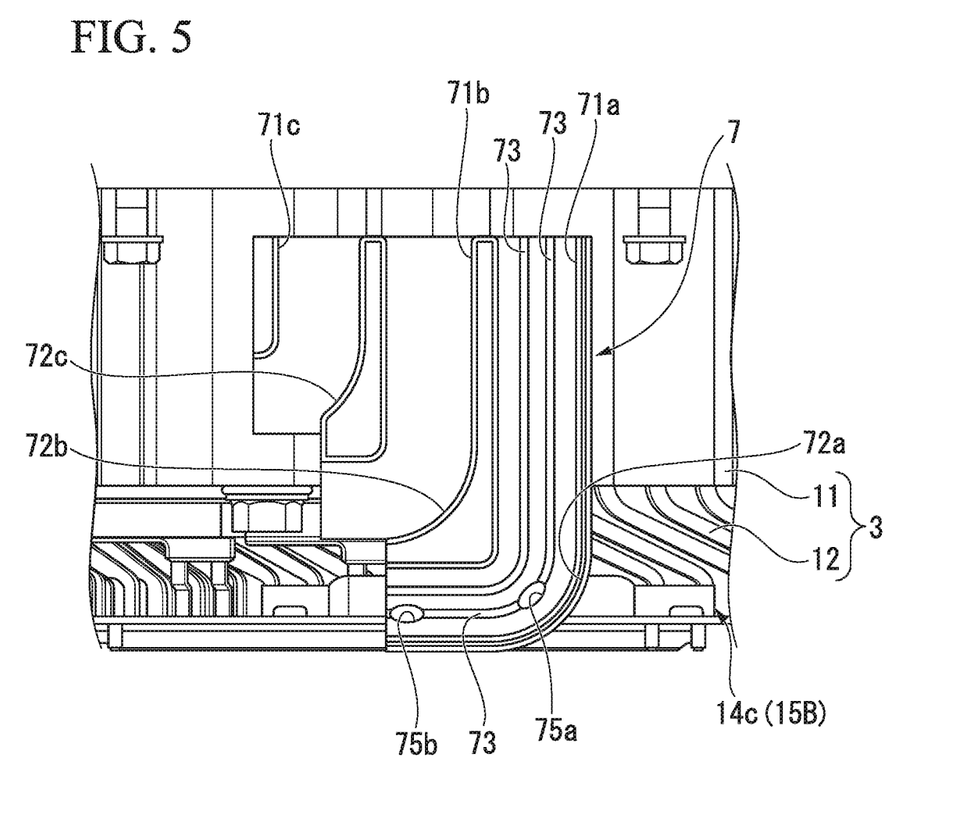
FIG. 5 is an explanatory view of the cover member and a vicinity of the cover member inside the case when viewed from above.

FIG. 5 is an explanatory view of the cover member and a vicinity of the cover member inside the case when viewed from above. In FIG. 5, illustration of three-phase bus bars 8 (corresponding to a "conductive member" in the claims, see FIG. 4) is omitted.

Figure 6:
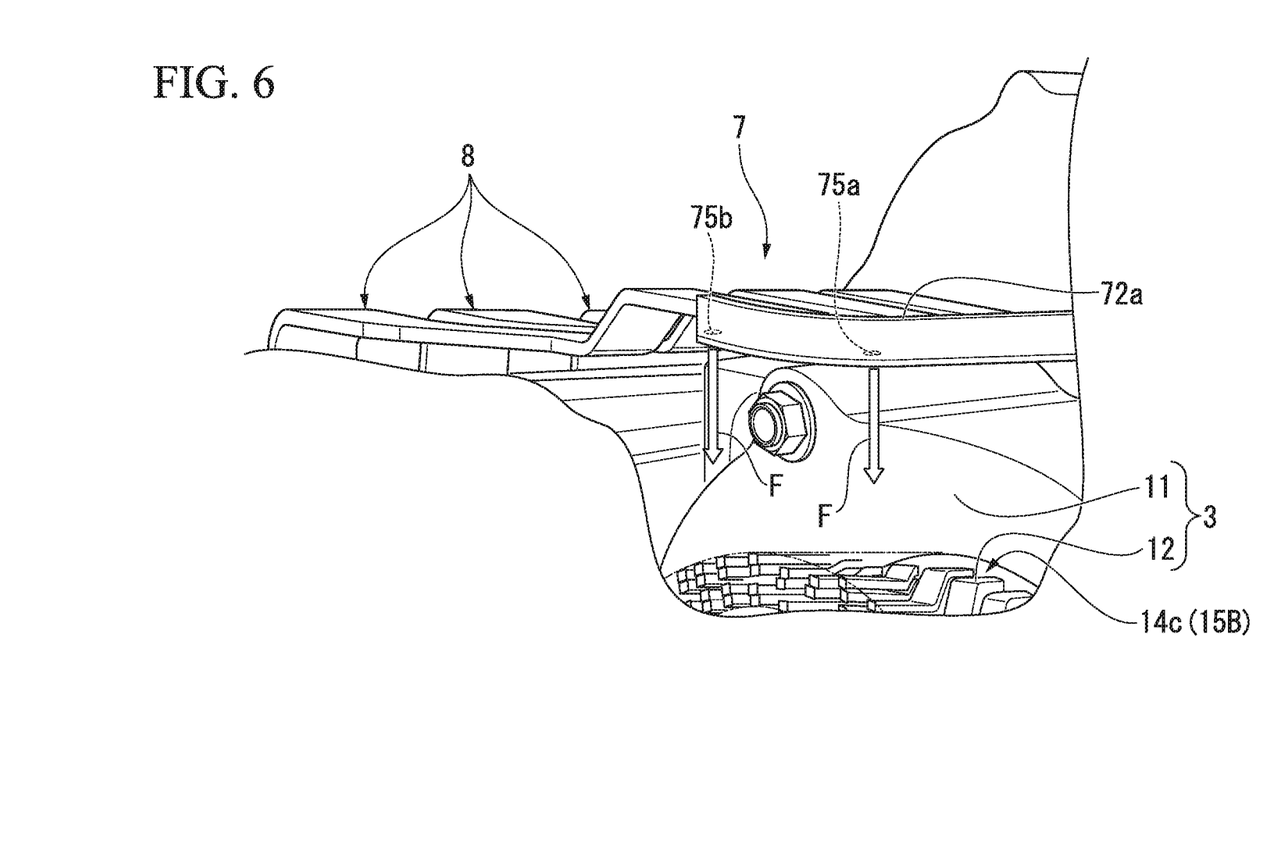
FIG. 6 is a perspective view of the cover member and a vicinity of the cover member inside the case.

FIG. 6 is a perspective view of the cover member and a vicinity of the cover member inside the case.

As illustrated in FIGS. 4 to 6, the refrigerant supply unit 6, the three-phase bus bars 8, and the cover member 7 are provided in the case 2.

The refrigerant supply unit 6 is a pipe-shaped member communicating with the refrigerant passage (not illustrated) formed in the case 2. The refrigerant supply unit 6 is provided to extend in the axial direction above the coil end 15B and the stator core 11 on the connecting portion 14c side. Although illustration and detailed explanation are omitted, the refrigerant supply unit 6 is similarly provided also on the crossing portion 14b side. That is, on the crossing portion 14b side, the refrigerant supply unit 6 is provided to extend in the axial direction above the coil end 15A and the stator core 11 on the crossing portion 14b side. Further, in the present embodiment, a refrigerant passes through a second refrigerant supply unit (not illustrated) provided in the inside of the output shaft 5 and the end surface plate, and is radially discharged to an outer side of the rotor in the radial direction.

A distal end 61 of the refrigerant supply unit 6 is disposed on an inner side in the axial direction of an end portion of the coil end 15B in the axial direction and is disposed on an outer side of the stator core 11 in the axial direction. A discharge hole capable of discharging a refrigerant circulated through the refrigerant passage, for example, by a mechanical pump, an electric pump, or the like is formed at the distal end 61 of the refrigerant supply unit 6. The discharge hole is provided at the distal end 61 of the refrigerant supply unit 6 to open in the radial direction of the refrigerant supply unit 6. Thereby, a refrigerant is radially discharged in a plurality of directions from the distal end 61 of the refrigerant supply unit 6. The refrigerant may be, for example, lubricating oil such as automatic transmission fluid (ATF).

The three-phase bus bars 8 are disposed above the coil end 15B. The three-phase bus bars 8 disposed above the coil end 15B are three plate-shaped members made of, for example, a conductive material such as copper. The three-phase bus bars 8 electrically connect between the winding 12 of each phase of U-phase, V-phase, and W-phase and a terminal of each phase of U-phase, V-phase, and W-phase of a three-phase connector (not illustrated) provided outside the case 2, respectively.

The cover member 7 is disposed above the coil end 15B. The cover member 7 is an insulating cover that covers the three-phase bus bars 8 from below. The cover member 7 is made of, for example, a resin material having insulation properties. The cover member 7 is disposed at a position slightly shifted in the circumferential direction from the refrigerant supply unit 6 when viewed from the axial direction.

As illustrated in FIG. 5, the cover member 7 includes accommodating recesses 71a, 71b, and 71c which can separately accommodate each phase of the three-phase bus bars 8. The accommodating recesses 71a, 71b, and 71c are respectively partitioned by wall portions and have a predetermined depth that can insulate each phase of the three-phase bus bars 8 from each other. The accommodating recesses 71a, 71b, and 71c accommodate the three-phase bus bars 8 in a state in which the phases of the three-phase bus bars 8 are insulated from each other.

The accommodating recesses 71a, 71b, and 71c respectively include first linear portions extending in the axial direction, second linear portions extending in the circumferential direction, and curved portions 72a, 72b, and 72c provided respectively between the first linear portions and the second linear portions, and are formed in an L shape in a plan view. Among the accommodating recesses 71a, 71b, and 71c, the curved portion 72a of one accommodating recess 71a is disposed at a position corresponding to the coil end 15B including the connecting portion 14c.

A plurality (two in the present embodiment) of holes 75a and 75b penetrating in the vertical direction are provided in the accommodating recess 71a of the cover member 7 at positions corresponding to the coil end 15B.

One hole 75a of the holes 75a and 75b is formed at a corner portion of the curved portion 72a. Also, the other hole 75b of the holes 75a and 75b is formed at a position spaced apart from one hole 75a in the circumferential direction.

Further, a guide portion 73 for guiding a refrigerant to the holes 75a and 75b is provided in the accommodating recess 71a of the cover member 7. The guide portion 73 may be, for example, a plurality of grooves provided in a bottom portion of the accommodating recess 71a. The guide portion 73 may be provided to connect, for example, end portions of the accommodating recess 71a to the holes 75a and 75b, and connect one hole 75a to the other hole 75b.

Here, some of a refrigerant discharged from the distal end 61 of the refrigerant supply unit 6 and some of the refrigerant discharged from the second refrigerant supply unit enter the accommodating recess 71a of the cover member 7. The refrigerant that has entered the accommodating recess 71a is introduced into the holes 75a and 75b through the bottom portion of the accommodating recess 71a or the guide portion 73. Thereafter, as illustrated in FIGS. 4 and 6, the refrigerant that has entered the accommodating recess 71a of the cover member 7 falls through the holes 75a and 75b due to gravity and is supplied to the coil end 15B thereunder (see arrows F in FIGS. 4 and 6). The refrigerant supplied to the coil end 15B permeates from the coil end 15B to cool the winding 12 and the stator core 11.

According to the present embodiment, the three-phase bus bars 8 disposed above the coil end 15B, the cover member 7 covering the three-phase bus bars 8 from below and disposed above the coil end 15B, and the refrigerant supply unit 6 which supplies a refrigerant are provided, in which, since the holes 75a and 75b penetrating in the vertical direction at positions corresponding to the coil end 15B are provided in the cover member 7, the refrigerant supplied from the refrigerant supply unit 6 and entering the cover member 7 falls through the holes 75a and 75b due to gravity and is supplied to the coil end 15B thereunder. Thereby, the refrigerant permeates from the coil end 15B and can cool the winding 12 and the stator core 11. Further, as in the conventional technology, short-circuiting of the cover member 7 can be prevented, and deterioration of the cover member 7, a refrigerant, or the like caused by accumulation of a refrigerant can be inhibited. Therefore, according to the rotary electric machine 1 of the present embodiment, since deterioration of the cover member 7, a refrigerant, or the like can be inhibited, and the stator 3 can be cooled by a refrigerant discharged through the holes 75a and 75b of the cover member 7, cooling can be effectively performed compared to the conventional technology.

According to the rotary electric machine 1 of the present embodiment, since the guide portion 73 for guiding a refrigerant to the holes 75a and 75b is provided in the cover member 7, a refrigerant that has entered the cover member 7 falls through the holes 75a and 75b due to gravity without staying and is supplied to the coil end 15B thereunder. Accordingly, deterioration of the cover member 7, a refrigerant, or the like can be further inhibited, and the stator 3 can be cooled by a refrigerant discharged through the holes 75a and 75b of the cover member 7.

According to the rotary electric machine 1 of the present embodiment, since the cover member 7 includes the accommodating recesses 71a, 71b, and 71c capable of accommodating the three-phase bus bars 8 and the hole 75a is formed at a corner portion of the curved portion 72a in the accommodating recess 71a, a refrigerant that has entered the cover member 7 is discharged without staying at the corner portion of the accommodating recess 71a. Accordingly, deterioration of the cover member 7, a refrigerant, or the like can be further inhibited, and the stator can be cooled by a refrigerant discharged through the holes 75a and 75b of the cover member 7. Further, since a creepage distance serving as an insulation distance can be secured by providing the accommodating recesses 71a, 71b, and 71c capable of accommodating the three-phase bus bars 8, insulation of the three-phase bus bars 8 can be secured while improving ease of layout.

According to the rotary electric machine 1 of the present embodiment, since the coil end 15B includes the connecting portion 14c to which a plurality of segment coils 14 are connected and the cover member 7 is disposed above the coil end 15B including the connecting portion 14c, a refrigerant can be supplied to the connecting portion 14c which is more likely to generate heat than the crossing portion 14b among the coil ends 15A and 15B through the holes 75a and 75b of the cover member 7. Therefore, according to the present embodiment, the winding 12 can be efficiently cooled.

The technical scope of the present invention is not limited to the above-described embodiments, and various modifications can be made without departing from the gist of the present invention.

In the above-described embodiment, the cover member 7 covers the coil end 15B including the connecting portion 14c from above, but an upper body that covers the coil end 15A side including the crossing portion 14b from above may also be provided.

In the above embodiment, the cover member 7 including the holes 75a and 75b is an insulating cover that covers the three-phase bus bars 8 from below, but for example, a hole may be provided in an insulating cover covering another conductive member such as a terminal and disposed above the coil ends 15A and 15B.

Although, the cover member 7 covers the three-phase bus bars 8 from below in the above-described embodiment, a cover covering the three-phase bus bars 8 from above may be further provided.

In addition, the components in the above-described embodiments can be appropriately replaced with well-known components without departing from the spirit and scope of the present invention, and furthermore, each of the above-described embodiments and each of the modified examples may be appropriately combined.

What is claimed is:
1. A rotary electric machine comprising:
 a stator including an annular stator core and a winding mounted on the stator core and configured to have a coil end protruding in an axial direction of the stator core;
 a bus bar electrically connected to the winding of the stator and in which at least a portion thereof is disposed only above the coil end;
 a cover member covering the bus bar from below and disposed above the coil end; and
 a refrigerant supply unit configured to discharge a refrigerant in a predetermined direction and supply the refrigerant to the stator, wherein
 a hole penetrating in a vertical direction is provided in the cover member at a position corresponding to the coil end.
2. The rotary electric machine according to claim 1, wherein a guide portion which guides the refrigerant to the hole is provided in the cover member.
3. The rotary electric machine according to claim 1, wherein
 the cover member includes an accommodating recess which is able to accommodate the bus bar,
 the accommodating recess includes a curved portion at a position corresponding to the coil end in a plan view, and
 the hole is formed at a corner portion of the curved portion.
4. The rotary electric machine according to claim 1, wherein
 the winding is formed by a plurality of segment coils used by being connected to each other,
 the coil end includes a connecting portion to which the plurality of segment coils are connected, and
 the cover member is disposed above the coil end including the connecting portion.

* * * * *